United States Patent
Yu et al.

(10) Patent No.: US 8,948,556 B2
(45) Date of Patent: Feb. 3, 2015

(54) OPTICAL-ELECTRICAL COMPOSITE CABLE

(71) Applicant: Hitachi Cable, Ltd., Tokyo (JP)

(72) Inventors: Juhyun Yu, Mito (JP); Osamu Seya, Hitachi (JP); Yoshinori Sunaga, Hitachinaka (JP); Kouki Hirano, Hitachinaka (JP); Hiroki Yasuda, Mito (JP); Yoshikazu Namekawa, Hitachi (JP); Takanobu Watanabe, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 40 days.

(21) Appl. No.: 13/783,940

(22) Filed: Mar. 4, 2013

(65) Prior Publication Data

US 2014/0079359 A1 Mar. 20, 2014

(30) Foreign Application Priority Data

Sep. 20, 2012 (JP) .................................. 2012-206722

(51) Int. Cl.
*G02B 6/44* (2006.01)
*H01B 11/22* (2006.01)

(52) U.S. Cl.
CPC .............. *H01B 11/22* (2013.01); *G02B 6/4416* (2013.01); *G02B 6/44* (2013.01)
USPC ...................................................... 385/101

(58) Field of Classification Search
CPC .............................. H01B 11/22; G02B 6/4416
USPC .......................................................... 385/101
See application file for complete search history.

(56) References Cited

U.S. PATENT DOCUMENTS

| | | | | |
|---|---|---|---|---|
| 4,365,865 A * | 12/1982 | Stiles | ............................. | 385/101 |
| 4,389,088 A * | 6/1983 | Trezequet | ..................... | 385/111 |
| 4,944,570 A * | 7/1990 | Oglesby et al. | ............... | 385/101 |
| 5,495,546 A * | 2/1996 | Bottoms et al. | .............. | 385/101 |
| 6,195,487 B1 * | 2/2001 | Anderson et al. | ............. | 385/101 |
| 6,496,629 B2 * | 12/2002 | Ma et al. | ....................... | 385/113 |
| 8,792,760 B2 * | 7/2014 | Choi et al. | .................... | 385/101 |
| 2011/0280527 A1 | 11/2011 | Tamura | | |
| 2011/0311191 A1 | 12/2011 | Hayashishita et al. | | |

FOREIGN PATENT DOCUMENTS

| JP | 3192559 B | 5/2001 |
|---|---|---|
| JP | A-2011-018544 | 1/2011 |
| JP | 2011243318 A | 12/2011 |
| JP | A-2012-9156 | 1/2012 |
| JP | 2012043557 | 2/2014 |

\* cited by examiner

*Primary Examiner* — Daniel Petkovsek
(74) *Attorney, Agent, or Firm* — Scully, Scott, Murphy & Presser, P.C.

(57) ABSTRACT

An optical-electrical composite cable includes an optical fiber, a tubular resin inner cover to enclose the optical fiber, a plurality of electric wires disposed on an outside of the inner cover, and a tubular outer cover to collectively cover the plurality of electric wires. The plurality of electric wires are helically wound around an outer peripheral surface of the inner cover so as to be situated between the inner cover and the outer cover.

8 Claims, 4 Drawing Sheets

OPTICAL-ELECTRICAL COMPOSITE CABLE

The present application is based on Japanese patent application No. 2012-206722 filed on Sep. 20, 2012, the entire contents of which are incorporated herein by reference.

BACKGROUND OF THE INVENTION

1. Field of the Invention

The invention relates to an optical-electrical composite cable having an optical fiber and plural electric wires.

2. Description of the Related Art

A conventional optical-electrical composite cable used for, e.g., signal transmission between electronic devices such as personal computer or display is known in which an optical fiber and plural electric wires are covered all together with a sheath. Some of such optical-electrical composite cables adopt a structure in which an increase in optical loss caused by microbending of the optical fiber (slight bending of a central axis of a core caused by pressure (lateral pressure) applied from a side surface) is suppressed (see, e.g., JP-A-2011-018544 and JP-A-2012-009156).

In the optical-electrical composite cable described in JP-A-2011-018544, an optical fiber is arranged in the center and plural covered conductors are arranged to surround the optical fiber. In addition, a high-tensile fiber such as Kevlar (trademark) is filled between the optical fiber and the plural covered conductors. In this optical-electrical composite cable, an external force from outside of the sheath is absorbed by a covering of the covered conductor and is also dispersed by the high-tensile fiber, and it is thereby possible to reduce lateral pressure acting on the optical fiber.

In the optical-electrical composite cable described in JP-A-2012-009156, an optical fiber is arranged so as to be in contact with an inner peripheral surface of a protective tube and plural electric wires are arranged around an outer periphery of the protective tube. In this optical-electrical composite cable, since the optical fiber is protected from an external force by the protective tube, bending or twisting of the optical fiber due to the external force is suppressed and an increase in transmission loss is thus suppressed.

SUMMARY OF THE INVENTION

In the optical-electrical composite cable described in JP-A-2011-018544, since the high-tensile fiber between the optical fiber and the plural covered conductors is filled at a density which allows the high-tensile fiber to disperse the external force, there is no gap around the optical fiber and the external force may act as lateral pressure on the optical fiber via the high-tensile fiber.

In the optical-electrical composite cable described in JP-A-2012-009156, bending or twisting of the optical fiber caused by the external force can be prevented if the protective tube is sufficiently strengthened against the external force which may act on the optical-electrical composite cable, however, flexibility of the cable is degraded.

Accordingly, it is an object of the invention to provide an optical-electrical composite cable that allows a reduction in the optical loss caused by microbending of optical fiber while suppressing a decrease in flexibility.

(1) According to one embodiment of the invention, an optical-electrical composite cable comprises:
 an optical fiber;
 a tubular resin inner cover to enclose the optical fiber;
 a plurality of electric wires disposed on an outside of the inner cover; and
 a tubular outer cover to collectively cover the plurality of electric wires,
 wherein the plurality of electric wires are helically wound around an outer peripheral surface of the inner cover so as to be situated between the inner cover and the outer cover.

In the above embodiment (1) of the invention, the following modifications and changes can be made.

(i) A ratio of void space inside the inner cover is not less than 35%.

(ii) The optical-electrical composite cable further comprises a fibrous reinforcement member enclosed together with the optical fiber inside the inner cover so as to increase tensile strength of the cable.

(iii) The plurality of electric wires contact with each other so as to reduce load applied to the inner cover by an external force from an outer periphery side of the outer cover.

(iv) The number of the plurality of electric wires is not less than three and not more than ten.

(v) The following inequality expression is satisfied:

$$0.8 \times D\text{max} \leq D\text{min} \leq D\text{max}$$

where an outer diameter of the thickest of the plurality of electric wires is Dmax and an outer diameter of the thinnest of the plurality of electric wires is Dmin.

(vi) The inner cover comprises fluorinated ethylene propylene (FEP), perfluoroalkoxy (PFA), polyvinylidene fluoride (PVDF) or polyether ether ketone (PEEK).

(vii) An elastic modulus of the inner cover is not less than 0.3 GPa and not more than 4.0 GPa.

(viii) The following inequality expression is satisfied:

$$t \geq DB \times 0.20$$

where an outer diameter of the inner cover is DB and a thickness of the inner cover is t.

(ix) One optical fiber is enclosed inside the inner cover, wherein an inner diameter of the inner cover is 50 μm or more greater than an outer diameter of the optical fiber.

(x) A plurality of optical fibers are enclosed inside the inner cover, wherein the total value of outer diameters of the plurality of optical fibers is smaller than the inner diameter of the inner cover.

(xi) The plurality of electric wires are each covered with an insulation comprising fluorinated ethylene propylene (FEP), perfluoroalkoxy (PFA), polyvinylidene fluoride (PVDF) or polyethylene (PE).

Effects of the Invention

According to one embodiment of the invention, an optical-electrical composite cable can be provided that allows a reduction in the optical loss caused by microbending of optical fiber while suppressing a decrease in flexibility.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

First Embodiment

Figure 1:
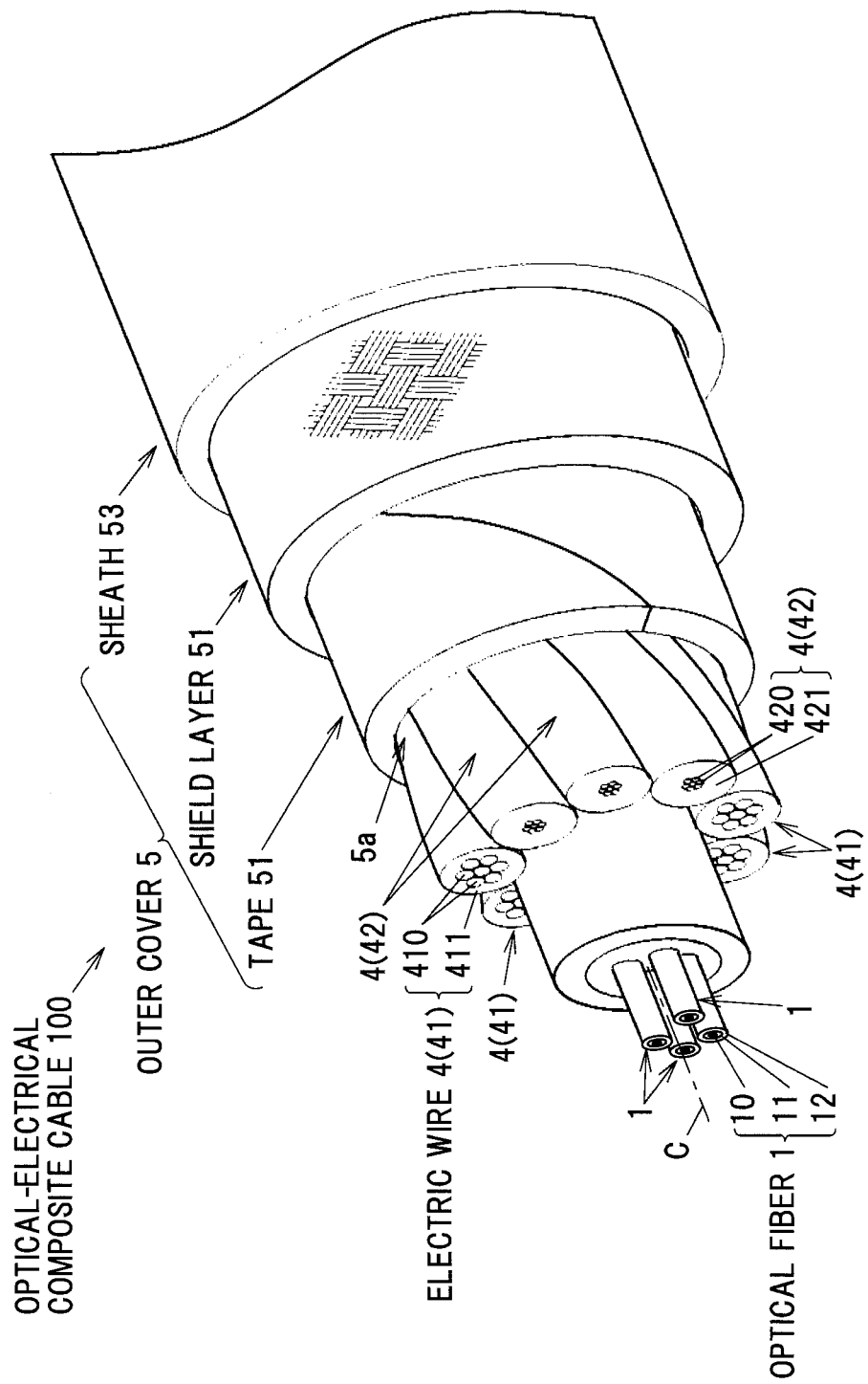
FIG. 1 is a perspective view showing a structure of an optical-electrical composite cable in a first embodiment of the present invention.
Figure 2:
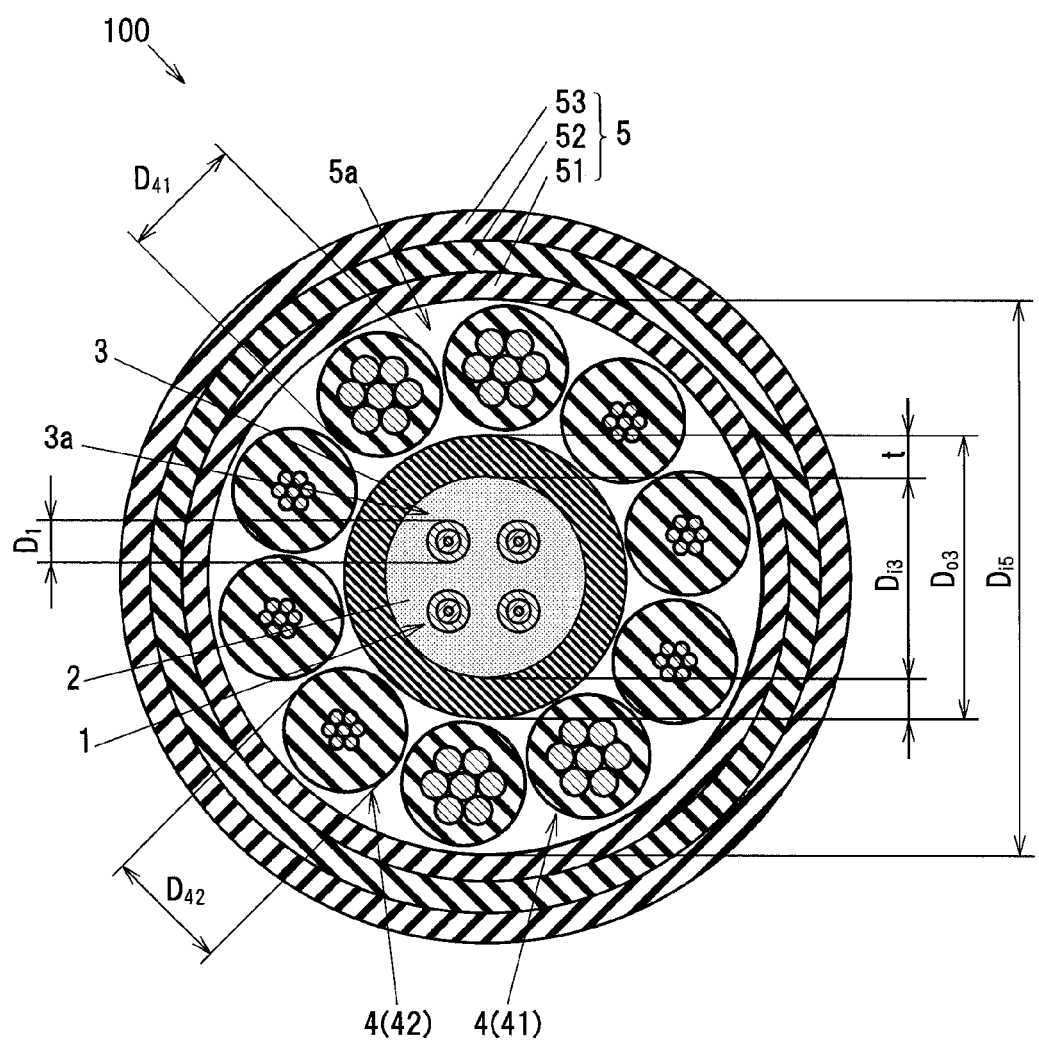
FIG. 2 is a cross sectional view of the optical-electrical composite cable, showing the cross section orthogonal to a central axis thereof.

The first embodiment of the invention will be described in reference to FIGS. 1 and 2. FIG. 1 is a perspective view showing a structure of an optical-electrical composite cable 100 in the first embodiment of the invention. FIG. 2 is a cross sectional view of the optical-electrical composite cable 100, showing the cross section orthogonal to a central axis C thereof.

The optical-electrical composite cable 100 is provided with an optical fiber 1, a tube 3 as a resin tubular inner cover for housing the optical fiber 1, plural electric wires 4 arranged on the outside of the tube 3 and a tubular outer cover 5 covering the plural electric wires 4 all together.

In the first embodiment, four optical fibers 1 and a fiber bundle 2 formed by bundling fibers such as aramid or Kevlar (trademark) are housed in a first housing portion 3a inside the tube 3. The fiber bundle 2 is an example of a fibrous reinforcement member for increasing tensile strength of the optical-electrical composite cable 100. The fiber bundle 2 is desirably filled so that a ratio of void space inside the tube 3 is not less than 35%. However, the fiber bundle 2 does not need to be provided when the required tensile strength is ensured by the tube 3 or the outer cover 5.

The optical fiber 1 has a core 10 in the center, a clad 11 covering an outer periphery of the core 10 and a covering 12 for covering an outer periphery of the clad 11. In the first embodiment, each of the four optical fibers 1 has the same structure and the same outer diameter. In this regard, however, the four optical fibers 1 may have outer diameters different from each other. In addition, the optical fiber 1 may be either a multi-mode optical fiber or a single-mode optical fiber.

The tube 3 is formed of fluorinated ethylene propylene (FEP), perfluoroalkoxy (PFA), polyvinylidene fluoride (PVDF) or polyether ether ketone (PEEK). In addition, an elastic modulus of the tube 3 is desirably not less than 0.3 GPa and not more than 4.0 GPa.

If the elastic modulus of the tube 3 is less than 0.3 GPa, an effect of protecting the optical fiber 1 is poor. If the elastic modulus is more than 4.0 GPa, flexibility of the optical-electrical composite cable 100 is degraded.

The plural electric wires 4 are housed in an annular second housing portion 5a between an inner peripheral surface of the outer cover 5 and an outer peripheral surface of the tube 3. In the first embodiment, ten electric wires 4 each having a circular cross section are arranged in the second housing portion 5a along a circumferential direction about the central axis C. In other words, the plural electric wires 4 are arranged so as not to overlap in a radial direction about the central axis C.

In addition, in the first embodiment, the ten electric wires 4 are composed of four power lines 41 and six signal lines 42. The power line 41 is formed by covering plural twisted cores 410 with a resin insulation 411. The signal line 42 is formed by covering plural twisted cores 420 with a resin insulation 421. The power line 41 is used for supplying power from an electronic device connected to one end of the optical-electrical composite cable 100 to another electronic device connected to another end of the optical-electrical composite cable 100. The signal line 42 is used for transmitting and receiving signals between the electronic device and the other electronic device. Alternatively, some of electric wires 4 may be a dummy wire which does not conduct electricity.

The insulations 411 and 421 are preferably formed of fluorinated ethylene propylene (FEP), perfluoroalkoxy (PFA), polyvinylidene fluoride (PVDF) or polyethylene (PE). These materials enhance slip between the tube 3 and the electric wire 4 and it is thus possible to prevent twisting or deformation of the tube 3 during production. In addition, since the electric wires 4 can efficiently move when the optical-electrical composite cable 100 is bent, a force which is applied to the tube 3 from the electric wires 4 can be suppressed. In other words, it is possible to prevent deformation of the tube 3 and thus to reduce lateral pressure toward the optical fiber 1. The insulations 411 and 421 may be formed of polytetrafluoroethylene (PTFE), polypropylene (PP), polyethylene terephthalate (PET) or polyphenylene sulfide (PPS), etc.

The outer cover 5 is composed of a resin tape 51 for bundling the plural electric wires 4, a shield layer 52 arranged on an outer periphery of the tape 51 and a tubular resin sheath 53 arranged on an outer periphery of the shield layer 52. The tape 51 is helically wound so as to be in contact with outer surfaces of the plural electric wires 4. The shield layer 52 is, e.g., a braid formed by braiding multiple conductor wires. Alternatively, the shield layer 52 may be formed of a conductive tape in which a conductive metal film is formed on a resin tape. The sheath 53 is formed of a resin such as polyethylene (PE) or polyvinyl chloride (PVC). An outer diameter of the outer cover 5 is, e.g., 5.9 mm.

The plural electric wires 4 are helically wound around an outer peripheral surface of the tube 3 so as to be interposed between the tube 3 and the outer cover 5, as shown in FIG. 1. In other words, a central axis of the electric wire 4 is inclined with respect to a direction parallel to the central axis C of the optical-electrical composite cable 100. A helical winding pitch of the plural electric wires 4 (a distance in a direction along the central axis C for winding a give electric wire 4 once around the tube 3) is desirably, e.g., not less than 5 mm and not more than 150 mm.

Since the plural electric wires 4 are helically arranged, flexibility of the optical-electrical composite cable 100 is increased as compared to the case where the electric wires 4 are linearly arranged parallel to the central axis C, and lateral pressure applied to the optical fiber 1 when bending the optical-electrical composite cable 100 is suppressed. That is, when the plural electric wires 4 are arranged parallel to the central axis C, it is difficult to bend due to tension generated in the electric wire 4 located on the outer side of the bent portion and the tube 3 is pressed by the tension. In addition, a compressive force which compresses the electric wire 4 in an axial direction acts on an electric wire 4 located on the inner side of the bent portion and impedes bending of the optical-electrical composite cable 100, and then, outwardly bulging curvature is generated on the electric wire 4 due to the compressive force and presses the tube 3. Therefore, the tube 3 is pressed from the inner and outer sides at the bent portion, and lateral pressure acts on the optical fiber 1 when a bend radius is small.

On the other hand, in the first embodiment, since the plural electric wires 4 are helically arranged, no specific electric wire 4 is arranged throughout the inner and outer sides of the bent portion of the optical-electrical composite cable 100 (in a region longer than the helical winding pitch). In other words, each electric wire 4 is present on the outer side or inner side of the tube 3 only in a region which is a half or less of the helical winding pitch. As a result, the tension in the portion on the outer side of the tube 3 is balanced out by the compressive force in the portion on the inner side, which reduces a force of the electric wire 4 pressing the tube and increases flexibility of the optical-electrical composite cable 100.

In addition, in the first embodiment, the plural electric wires 4 are formed such that $D_{41}$ and $D_{42}$ are the same in dimension as shown in FIG. 2, where an outer diameter of the power line 41 is $D_{41}$ and that of the signal line 42 is $D_{42}$. Although the cross sectional area of the plural cores 410 of the power line 41 is larger than that of the plural cores 420 of the of the signal line 42, the insulation 411 of the power line 41 is formed thinner than the insulation 421 of the signal line 42, and thus, the outer diameter of the power line 41 and that of the signal line 42 are the same in dimension.

In addition, in the first embodiment, although the outer diameter $D_{41}$ of the power line 41 and the outer diameter $D_{42}$ of the signal line 42 are the same in dimension as described above, $D_{41}$ and $D_{42}$ may be different from each other. In this case, it is desirable that the following inequality expression (1) be satisfied:

$$0.8 \times D_{max} \leq D_{min} \leq D_{max} \quad (1)$$

where an outer diameter of the thickest of the plural electric wires 4 is $D_{max}$ and an outer diameter of the thinnest of the plural electric wires 4 is $D_{min}$.

By determining the outer diameter of the plural electric wires 4 as described above, it is possible to suppress, e.g., constant pressure on the tube 3 from a specific electric wire 4 having a large outer diameter or creation of a large gap between an electric wire 4 having a small outer diameter and an outer peripheral surface of the tube 3 or an inner peripheral surface of the outer cover 5.

The plural electric wires 4 come into contact with each other, and load applied to the tube 3 by an external force from the outer periphery side of the outer cover 5 is thus reduced. In other words, when the optical-electrical composite cable 100 receives an external force, the outer cover 5 (the sheath 53, the shield layer 52 and the tape 51) deforms and some of the plural electric wires 4 receive a pressing force applied inwardly from the outer peripheral surface of the outer cover 5. The electric wire 4 which received the pressing force comes into contact with the tube 3, is deformed into an ellipse shape by receiving a reactive force of the tube 3, and comes into contact with an adjacent electric wire 4. A portion of the pressing force from the outer cover 5 is absorbed by this contact between the electric wires 4 and the load applied to the tube 3 is reduced. In other words, deformation of the tube 3 is suppressed.

In order to obtain this effect, the number of the plural electric wires 4 housed in the second housing portion 5a is desirably not less than three and not more than ten. This is because, in case of one or two electric wires 4, the load applied to the tube 3 cannot be reduced by the contact between the electric wires 4 and, in case of more than ten electric wires 4, an effect of absorbing the pressing force from the outer cover 5 by the contact between the electric wires 4 becomes poor due to a decrease in surface pressure between contact surfaces of the electric wires 4.

In addition, it is desirable that the following inequality expression (2) be satisfied:

$$(D_{i5}-D_{o3})/2 \times 0.8 \leq D_A \leq (D_{i5}-D_{o3})/2 \quad (2)$$

where an outer diameter of the tube 3 is $D_{o3}$, an inner diameter of the outer cover 5 is $D_{i5}$ and an average outer diameter of the plural electric wires 4 is $D_A$, as shown in FIG. 2.

That is, the maximum outer diameter of the plural electric wires 4 should be not less than 80% of a width of the second housing portion 5a (a distance between the outer peripheral surface of the tube 3 and the inner peripheral surface of the outer cover 5 in a radial direction about the central axis C). As a result, it is possible to surely obtain the effect of reducing the load applied to the tube 3 by the contact between the electric wires 4.

Meanwhile, it is desirable that a thickness t of the tube 3, which is derived by calculating $(D_{o3}-D_{i3})/2$ where an inner diameter of the tube 3 is $D_{i3}$ and the outer diameter thereof is $D_{o3}$, satisfy the following inequality expression (3):

$$t \geq D_{o3} \times 0.20 \quad (3)$$

In other words, the thickness t of the tube 3 should be not less than one-fifth of the outer diameter $D_{o3}$. Strength of the tube 3 is ensured by forming the tube 3 as described above, which suppresses deformation thereof due to an external force and allows lateral pressure acting on the optical fiber 1 in the first housing portion 3a to be reduced.

Note that, the inner diameter $D_{i3}$ and the outer diameter $D_{o3}$ of the tube 3 are dimensions when the inner and outer peripheral surfaces of the tube 3 in a cross section orthogonal to the central axis form perfect circles without deformation of the tube 3, and $D_{i3}$ and $D_{o3}$ are equal to a value derived by dividing a circumferential length of the inner and outer peripheral surfaces on the cross section by π (circular constant).

Meanwhile, as shown in FIG. 2, when the outer diameter of the optical fiber 1 is defined as $D_1$, the total value of the outer diameters of the four optical fibers 1 ($D_1 \times 4$) is desirably smaller than the inner diameter ($D_{i3}$) of the tube 3. This is because a gap is formed between the optical fiber 1 and the inner peripheral surface of the tube 3 or between the optical fibers 1 even when the four optical fibers 1 are linearly aligned inside the first housing portion 3a, and the pressing force acting on the tube 3 can be prevented from directly acting as lateral pressure on the optical fiber 1 even when the tube 3 is deformed by the external force in a recessed manner.

Meanwhile, a ratio of void space in the first housing portion 3a of the tube 3 is desirably not less than 35%. The "void space" here refers to a portion inside the first housing portion 3a where the four optical fibers 1 and the fiber bundle 2 are not present. In other words, the ratio $R_3$ of void space in the first housing portion 3a is obtained by the following formula (4):

$$R_3 = (C_1 - V_1 - V_2)/C_1 \quad (4)$$

where the cubic capacity of the first housing portion 3a is $C_1$, the volume of the optical fibers 1 in the first housing portion 3a is $V_1$ and the volume of the fiber bundle 2 in the first housing portion 3a is $V_2$. Also, the ratio $R_3$ of void space is desirably not less than 35%.

In more detail, a ratio of the volume of the four optical fibers 1 in the first housing portion 3a (occupancy of the optical fibers 1 ($=V_1/C_1$)) should be not less than 2% and not more than 25%. Meanwhile, a ratio of the volume of the fiber bundle 2 in the first housing portion 3a (occupancy of the fiber bundle 2 ($=V_2/C_1$)) should be not less than 2% and not more than 50%. In this case, the ratio $R_3$ of void space is not more than 96% (when the occupancy of the optical fibers 1 and that of the fiber bundle 2 are both 2%). In addition, when the fiber bundle 2 is not housed in the first housing portion 3a, the upper limit of the ratio $R_3$ of void space is 98%.

Even when the tube 3 is deformed by the external force, lateral pressure applied to the optical fiber 1 by the deformation is suppressed when the ratio of void space in the first housing portion 3a is determined as described above. In other words, even when the tube 3 is crushed and deformed by the external force, the deformation is absorbed by narrowing the void space in the first housing portion 3a and the pressing force acting on the tube 3 is prevented from directly acting as lateral pressure on the optical fiber 1.

Effects of the First Embodiment

In the first embodiment, it is possible to reduce optical loss caused by microbending of the optical fiber while suppressing a decrease in flexibility.

Second Embodiment

Figure 3:
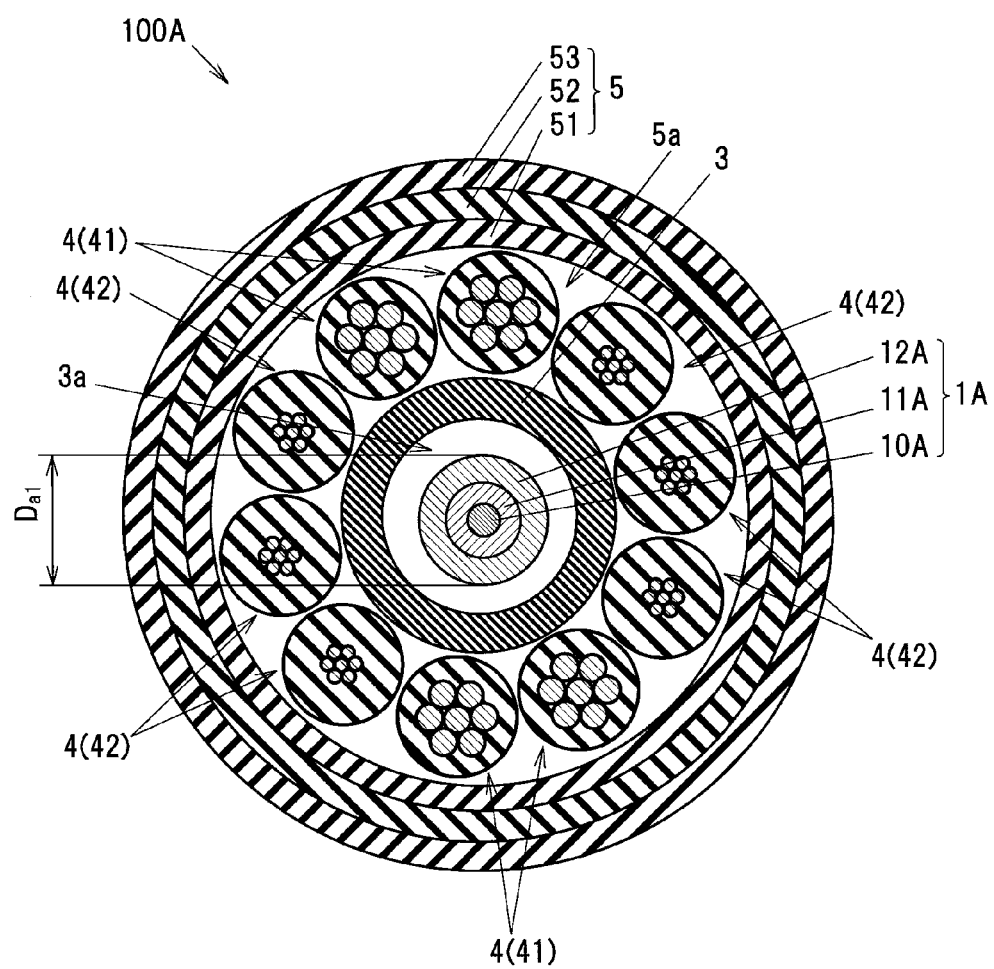
FIG. 3 is a cross sectional view showing an optical-electrical composite cable in a second embodiment.

Next, the second embodiment of the invention will be described in reference to FIG. 3. FIG. 3 is a cross sectional view showing an optical-electrical composite cable 100A in the second embodiment. In FIG. 3, constituent elements in common with those explained for the optical-electrical composite cable 100 in the first embodiment are denoted by the same reference numerals and the explanation thereof will be omitted.

The optical-electrical composite cable 100A in the second embodiment has the same structure as the optical-electrical composite cable 100 in the first embodiment except the structure of the inside of the first housing portion 3a. In other words, the optical-electrical composite cable 100A in the second embodiment is configured such that one optical fiber 1A is housed in the first housing portion 3a without housing the fiber bundle while the optical-electrical composite cable 100 in the first embodiment is configured such that the four optical fibers 1 and the fiber bundle 2 are housed in the first housing portion 3a.

The optical fiber 1A has a core 10A, a clad 11A covering an outer periphery of the core 10A and a covering 12A for covering an outer periphery of the clad 11A. The inner diameter $D_{i3}$ of the tube 3 (see FIG. 2) is larger than an outer diameter $D_{a1}$ of the optical fiber 1A and a dimensional difference between the inner diameter $D_{i3}$ of the tube 3 and the outer diameter $D_{a1}$ of the optical fiber 1A is not less than 50 μm.

In the second embodiment, even if the tube 3 is crushed and deformed, the dimensional difference between the inner diameter $D_{i3}$ of the tube 3 and the outer diameter $D_{a1}$ of the optical fiber 1A prevents the optical fiber 1A from receiving lateral pressure from the inner peripheral surface of the tube 3 as long as change in the inner diameter of the tube 3 is not more than 50 μm. As a result, it is possible to reduce optical loss caused by microbending of the optical fiber while suppressing a decrease in flexibility in the same manner as the first embodiment.

Third Embodiment

Figure 4:
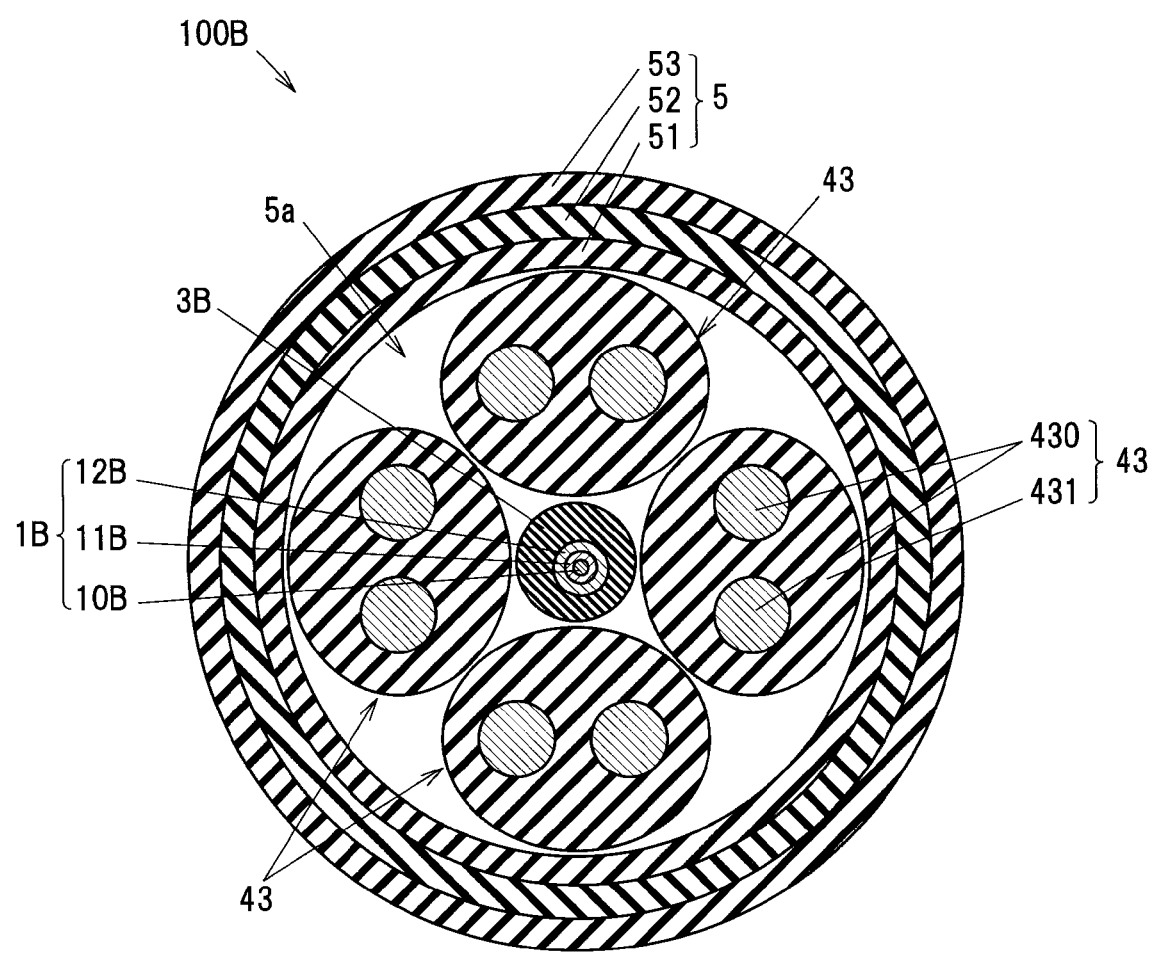
FIG. 4 is a cross sectional view showing an optical-electrical composite cable in a third embodiment.

Next, the third embodiment of the invention will be described in reference to FIG. 4. FIG. 4 is a cross sectional view showing an optical-electrical composite cable 100B in the third embodiment. In FIG. 4, constituent elements in common with those explained for the optical-electrical composite cable 100 in the first embodiment are denoted by the same reference numerals and the explanation thereof will be omitted.

The optical-electrical composite cable 100B in the third embodiment is different from the optical-electrical composite cable 100 in the first embodiment in that one optical fiber 1B is housed in a tube 3B and plural (four) differential signal lines 43 are arranged in the second housing portion 5a between an outer peripheral surface of the tube 3B and the inner peripheral surface of the outer cover 5 (the tape 51).

The optical fiber 1B has a core 10B, a clad 11B and a covering 12B. The inner diameter of the tube 3B is 50 μm or more greater than the outer diameter of the optical fiber 1B.

The differential signal line 43 has a pair of cores 430 each formed of a conductor and an insulation 431 covering the pair of cores 430 all together so as to prevent short circuit between the cores 430. In the example shown in FIG. 4, the insulation 431 is formed to have an oval-shaped outer rim so that a major axis thereof is longer than a distance between the outer peripheral surface of the tube 3B and the inner peripheral surface of the outer cover 5 and a minor axis is equal to or shorter than a distance between the outer peripheral surface of the tube 3B and the inner peripheral surface of the outer cover 5. In this regard, however, the outer rim of the insulation 431 on this cross section may be a circular shape.

The four differential signal lines 43 are helically wound around the outer peripheral surface of the tube 3B. In addition, the four differential signal lines 43 come into contact with each other due to the external force from the outer periphery side of the outer cover 5 and the load applied to the tube 3B is reduced.

Also in the third embodiment, it is possible to reduce optical loss caused by microbending of the optical fiber while suppressing a decrease in flexibility in the same manner as the first embodiment.

Although the embodiments of the invention has been described, the invention according to claims is not to be limited to the above-mentioned embodiments. Further, please note that all combinations of the features described in the embodiments are not necessary to solve the problem of the invention.

In addition, the invention can be appropriately modified and implemented without departing from the gist thereof. For example, although the outer cover 5 composed of the tape 51, the shield layer 52 and the sheath 53 has been described in each of the embodiments, the outer cover 5 may be formed of only the sheath 53 without having the tape 51 and the shield layer 52.

What is claimed is:

1. An optical-electrical composite cable, comprising:
   an optical fiber;
   a tubular inner cover comprising resin to enclose the optical fiber;
   a plurality of electric wires disposed on an outside of the inner cover; and
   a tubular outer cover to collectively cover the plurality of electric wires, wherein the plurality of electric wires are helically wound around an outer peripheral surface of the inner cover so as to be situated between the inner cover and the outer cover to cover a periphery of the inner cover,
   wherein an elastic modulus of the inner cover is not less than 0.3 GPa and not more than 4.0 GPa,
   wherein a helical winding pitch of the plurality of electric wires is not less than 5 mm and not more than 150 mm,
   wherein load applied to the inner cover by an external force from an outer periphery side of the outer cover is reduced by a contact between adjacent electric wires of the plurality of electric wires and sliding of the plurality of electric wires with respect to the inner cover, and
   wherein a void space is formed between the optical fiber and the inner cover and the void space is not less than 35% of a whole area within the inner cover.

2. The optical-electrical composite cable according to claim 1, further comprising a fibrous reinforcement member enclosed together with the optical fiber inside the inner cover so as to increase tensile strength of the cable.

3. The optical-electrical composite cable according to claim 1, wherein the following inequality expression is satisfied:

$$0.8 \times D_{max} \le D_{min} \le D_{max}$$

where an outer diameter of the thickest of the plurality of electric wires is $D_{max}$ and an outer diameter of the thinnest of the plurality of electric wires is $D_{min}$.

4. The optical-electrical composite cable according to claim 1, wherein the inner cover comprises fluorinated ethylene propylene (FEP), perfluoroalkoxy (PFA), polyvinylidene 3 fluoride (PVDF) or polyether ether ketone (PEEK).

5. The optical-electrical composite cable according to claim 1, wherein the following inequality expression is satisfied:

$$t \ge D_B \times 0.20$$

where an outer diameter of the inner cover is DB and a thickness of the inner cover is t.

6. The optical-electrical composite cable according to claim 1, wherein one optical fiber is enclosed inside the inner cover, and wherein an inner diameter of the inner cover is 50 μm or more greater than an outer diameter of the optical fiber.

7. The optical-electrical composite cable according to claim 1, wherein a plurality of optical fibers are enclosed inside the inner cover, and wherein the total value of outer diameters of the plurality of optical fibers is smaller than the inner diameter of the inner cover.

8. The optical-electrical composite cable according to claim 1, wherein the plurality of electric wires are each covered with an insulation comprising fluorinated ethylene 3 propylene (FEP), perfluoroalkoxy (PFA), polyvinylidene fluoride (PVDF) or polyethylene 4 (PE).

* * * * *